United States Patent
Kumar et al.

(10) Patent No.: US 11,144,627 B2
(45) Date of Patent: Oct. 12, 2021

(54) PEER ASSISTED ENHANCED AUTHENTICATION

(71) Applicant: QUALCOMM Incorporated, San Diego, CA (US)

(72) Inventors: Akash Kumar, Hyderabad (IN); Sai Pradeep Venkatraman, Santa Clara, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 15/709,734

(22) Filed: Sep. 20, 2017

(65) Prior Publication Data

US 2019/0087561 A1    Mar. 21, 2019

(51) Int. Cl.

| | |
|---|---|
| G06F 21/35 | (2013.01) |
| G06F 21/45 | (2013.01) |
| H04W 4/02 | (2018.01) |
| H04W 12/06 | (2021.01) |
| H04W 12/08 | (2021.01) |
| H04L 29/06 | (2006.01) |

(Continued)

(52) U.S. Cl.
CPC .............. *G06F 21/35* (2013.01); *G06F 21/32* (2013.01); *G06F 21/45* (2013.01); *H04L 9/3226* (2013.01); *H04L 63/0853* (2013.01); *H04L 63/0876* (2013.01); *H04L 63/107* (2013.01); *H04W 4/02* (2013.01); *H04W 4/80* (2018.02); *H04W 12/06* (2013.01); *H04W 12/08* (2013.01); *G06F 2221/2111* (2013.01); *H04L 63/0861* (2013.01); *H04L 63/105* (2013.01); *H04L 63/108* (2013.01); *H04M 1/72412* (2021.01); *H04M 1/72457* (2021.01); *H04W 12/61* (2021.01); *H04W 12/63* (2021.01)

(58) Field of Classification Search
CPC ....................................................... G06F 21/35
See application file for complete search history.

(56) References Cited

U.S. PATENT DOCUMENTS

| 8,786,438 B2 * | 7/2014 | Holley | ..................... H04L 67/18 |
| | | | 340/568.1 |
| 9,294,476 B1 * | 3/2016 | Lurey | .................. H04L 63/0492 |

(Continued)

FOREIGN PATENT DOCUMENTS

| EP | 2869528 A1 | 5/2015 |
| WO | 2017031504 A1 | 2/2017 |

OTHER PUBLICATIONS

International Search Report and Written Opinion—PCT/US2018/051548—ISA/EPO—dated Nov. 9, 2018.

(Continued)

*Primary Examiner* — Harris C Wang
(74) *Attorney, Agent, or Firm* — Thien T. Nguyen

(57) ABSTRACT

Techniques for validating a user on an electronic device in an Internet of Things (IoT) environment are provided. An example of an apparatus according to the disclosure includes a transceiver configured to detect one or more proximate devices, and at least one processor operably coupled to the transceiver and configured to receive authentication information from the user, determine that the one or more proximate devices is at least one companion device, and validate the user based on the authentication information and a detection of the at least one companion device.

23 Claims, 13 Drawing Sheets

(51) Int. Cl.
*G06F 21/32* (2013.01)
*H04W 4/80* (2018.01)
*H04L 9/32* (2006.01)
*H04M 1/72412* (2021.01)
*H04M 1/72457* (2021.01)
*H04W 12/61* (2021.01)
*H04W 12/63* (2021.01)

(56) References Cited

U.S. PATENT DOCUMENTS

| | | |
|---|---|---|
| 9,405,890 B1 | 8/2016 | Nishitani et al. |
| 9,426,161 B2 | 8/2016 | Baliga et al. |
| 2007/0073870 A1* | 3/2007 | Park .................. H04N 21/4131 709/224 |
| 2014/0078079 A1* | 3/2014 | Wang ...................... H04M 1/67 345/173 |
| 2014/0199969 A1* | 7/2014 | Johnsson .......... H04W 12/0431 455/411 |
| 2015/0019553 A1* | 1/2015 | Shaashua ............... G06N 7/005 707/737 |
| 2015/0019714 A1* | 1/2015 | Shaashua ............ H04L 12/2818 709/224 |
| 2015/0081904 A1* | 3/2015 | Guedalia ................ H04W 4/70 709/225 |
| 2015/0141076 A1* | 5/2015 | Libin ...................... H04W 4/60 455/557 |
| 2015/0161370 A1 | 6/2015 | North et al. |
| 2015/0362977 A1* | 12/2015 | Doniwa ................ G06F 1/3231 713/324 |
| 2016/0066184 A1* | 3/2016 | Bhargav-Spantzel ....................... H04W 12/06 726/7 |
| 2016/0315929 A1 | 10/2016 | Childress et al. |
| 2017/0289153 A1* | 10/2017 | Raziel ................... H04L 9/0897 |
| 2017/0295173 A1* | 10/2017 | Walsh ................ H04L 63/0853 |
| 2018/0026973 A1* | 1/2018 | Le Saint ............. G06F 21/6218 713/168 |

OTHER PUBLICATIONS

Gupta U., "Application of Multi Factor Authentication in Internet of Things Domain", Information Networking Institute, 2015, 6 Pages.

* cited by examiner

PEER ASSISTED ENHANCED AUTHENTICATION

BACKGROUND

I. Field

The disclosure relates generally to electronic devices, and more specifically to validating a user of an electronic device in an Internet of Things (IoT) environment.

II. Background

Data processing devices such as smart phones and personal computing systems often rely on user validation techniques such as password protection to enable operation. Many mobile devices include biometric readers to increase security for access to the device. In general, password protected and/or biometric security systems allow a user to gain access if the password and/or biometric information submitted by the user is validated by the device. The security features of password and biometric authentication systems may depend on the integrity of the software and hardware components within a data processing device. A corrupted operating system, or authentication algorithm, may allow malicious code (e.g., malware) to execute on a data processing device. Such malicious code may circumvent the authentication process and provide unauthorized access to a user's personal or confidential information. The introduction of malicious code into the data processing device may also create complications in the password and biometric processes. Further, false or spoofed biometric inputs may be used to attack a trusted biometric system. A falsified biometric trait, such as a fake finger comprised of wax, clay, gummy bears, etc., may be presented to a biometric scanner in an effort to by-pass security restrictions. In scenarios where a password is disclosed or a biometric input is spoofed, there may be no secondary authentication process and user information may be compromised.

SUMMARY

An example of a method according to the disclosure includes receiving, at a communication device, authentication information from the user, detecting, by the communication device, one or more companion devices, and validating, by the communication device, the user based on the authentication information and a detection of the one or more companion devices.

Implementations of such a method may include one or more of the following features. The one or more companion devices may include an infrastructure specific device. The one or more companion devices may include a user specific electronic device that is configured to be worn or carried by the user. The one or more companion devices may be detected based at least in part on receiving companion device information from a server. The one or more companion devices may be detected based at least in part on accessing a memory in the communication device. The method may include determining, by the communication device, a current location of the communication device, and detecting, by the communication device, the one or more companion devices based at least in part on the current location of the communication device. Determining, by the communication device, a current time, and detecting, by the communication device, the one or more companion devices based at least in part on the current time. Determining, by the communication device, a currently executing application, and detecting, by the communication device, the one or more companion devices based on the currently executing application. Detecting, by the communication device, a remote application, and detecting, by the communication device, the one or more companion devices based on the remote application. Receiving, by the communication device, one or more application and companion device options from the user, such that the one or more application and companion device options are configured to associate an application with a requirement that a respective companion device is detected, and detecting, by the communication device, the one or more companion devices based on the one or more application and companion device options. Receiving, by the communication device, one or more priority values, such that the one or more priority values indicate a level of access that the user will realize based on the detected one or more companion devices. Receiving, by the communication device, an indication of a mandatory device, such that detecting the mandatory device is required to validate the user.

An example of an apparatus according to the disclosure includes a transceiver configured to detect one or more proximate devices, and at least one processor operably coupled to the transceiver and configured to receive authentication information from the user, determine that the one or more proximate devices is at least one companion device, and validate the user based on the authentication information and a detection of the at least one companion device.

Implementations of such an apparatus may include one or more of the following features. The at least one companion device may include an infrastructure specific device. The at least one companion device may include a user specific electronic device that is configured to be worn or carried by the user. The at least one processor may be configured to receive companion device information from a server to determine that the one or more proximate devices is the at least one companion device. The at least one processor may be configured to access a local memory to obtain companion device information to determine that the one or more proximate devices is the at least one companion device. The at least one processor may be further configured to determine a current location of the user, and determine the at least one companion device based at least in part on the current location of the user. The at least one processor may be further configured to detect a currently executing application, and determine the at least one companion device based at least in part on the currently executing application. The at least one processor may be further configured to detect a remote application, and determine the at least one companion device based at least in part on the remote application. The at least one processor may be further configured to receive one or more application and companion device options from the user, such that the one or more application and companion device options are configured to associate an application with a requirement that a respective companion device is detected, and determine the at least one companion device based at least on part on the one or more application and companion device options. The at least one processor may be further configured to receive one or more priority values, such that the one or more priority values indicate a level of access that the user will realize based on the detected at least one companion device. The at least one processor may be further configured to receive an indication of a mandatory device, such that detecting the mandatory device is required to validate the user.

An example of an apparatus for validating a user on a communication device according to the disclosure includes means for receiving authentication information from the user, means for detecting one or more companion devices, and means for validating the user based on the authentication information and a detection of the one or more companion devices.

Items and/or techniques described herein may provide one or more of the following capabilities, as well as other capabilities not mentioned. A user may enter authentication information into a device. The authentication information may be a password or other biometric information. The biometric information may include facial recognition. The device may detect one or more proximate peer devices. The presence of the peer devices may be used as a second level of authentication for the user. The user may be validated/authenticated based on the authentication information and the presence of one or more peer devices. The terms validate and authenticate may be used synonymously throughout this disclosure. The valid peer devices may be based on user preferences and/or on historical peer presence data. A centralized server may be configured to store and disseminate the peer device data. Peer device data may be stored in local memory. Other capabilities may be provided and not every implementation according to the disclosure must provide any, let alone all, of the capabilities discussed.

DETAILED DESCRIPTION

Techniques are discussed herein validating a user on an electronic device in an Internet of Things (IoT) environment. A smart device such as a smartphone, tablet, laptop, etc. may include hardware and software component configured to validate a user. For example, a user may enter a password and/or biometric information (e.g., fingerprint, facial recognition, iris scan, etc.) and the smart device may be configured to validate the user input(s) before allowing access to the device. In an IoT environment, many such smart devices are also equipped to wirelessly communicate with other electronic devices, and may be configured to detect the presence of other devices that are within communications range. A smart device may also determine its own location based on satellite positioning system (SPS) signals, cellular network signals, and/or Wi-Fi signals, etc. that the devices receive.

In some IoT implementations, it may be desirable to limit the use of certain smart devices to authorized personnel and/or have restricted usage within a venue. Prior art authentication steps such as passwords and biometric validation steps may provide security, but hacks and spoofs to these techniques are becoming well known. In such an instance, where the password is mistakenly disclosed (e.g., via phishing emails or other nefarious techniques), or the biometric input is spoofed, a smart device typically is not configured to perform secondary authentication/validation steps. As will be discussed herein, a smart device may be configured to perform additional validation steps in the background to help guard against such malicious attempts to gain access to personal data.

In an example, a smart device may be configured to execute network discovery scans and identify known neighbor or peer devices. The smart device may be configured to perform a location session and check if it matches known locations. In the case of mobile devices that are typically associated with one user, signatures derived from motion sensors can be matched against expected signatures. Background validation operations may be started before a visible login process. For example, as soon as a smart device is lifted and moved, one or more stationary companion devices can be determined. A list of other stationary or mobile companion devices may be determined based on the day, time of day etc. and other user specified criteria. The peer presence of these companion devices may be used to confirm the vicinity of the current device in addition to the device's own authentication. In an example, determining a companion device may include maintaining a list of the last paired devices and then utilizing the peer presence of a last paired device as a secondary level of authentication. The peer presence may be established based on network protocols such as BLUETOOTH, and/or based on Long-Term Evolution Direct (LTE-D) discovery beacons or LTE proximity services utilizing the LTE spectrum.

Figure 1:
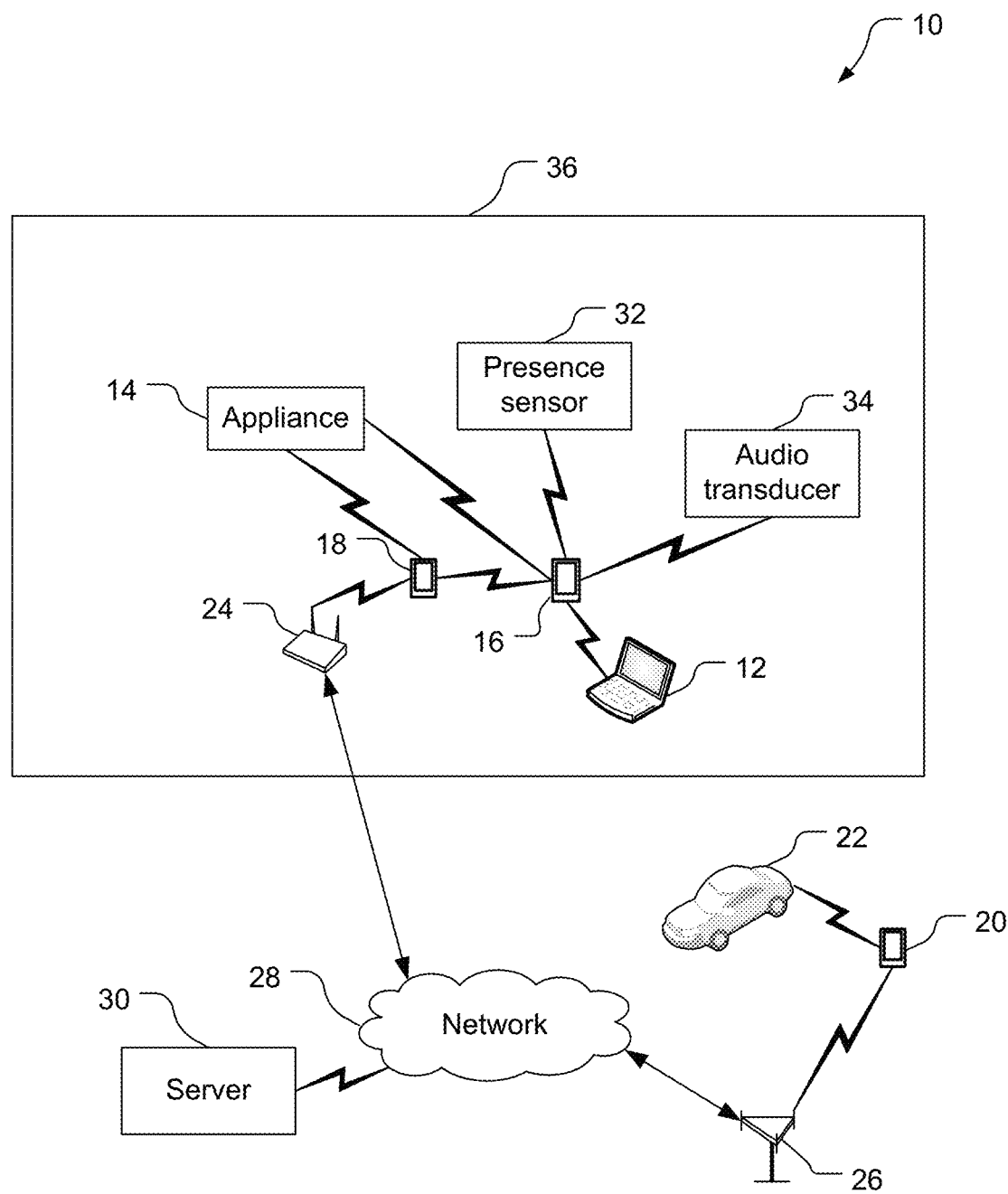
FIG. 1 is a simplified view of a communication system.

Referring to FIG. 1, a communication system 10 includes devices 12, 14, 16, 18, 20, 22, an access point 24, a base station 26, a network 28, a server 30, a presence sensor 32, and an audio transducer 34. The devices 12, 14, 16, 18, the access point 24, the presence sensor 32, and the audio transducer 34 are disposed inside a structure 36 (e.g., a building). The system 10 is a communication system in that components of the system 10 can communicate with one another directly or indirectly, e.g., via the network 28 and/or the access point 24 and/or the base station 26 (or other access points and/or other bases stations not shown). The system 10 is a communication system in that at least some of the components of the system 10 can communicate with one another wirelessly. For example, the base station 26 and the device 20 may communicate wirelessly using signals according to one or more protocols such as LTE, GSM, CDMA, or OFDM. The single access point 24 and the single base station 26 are examples only, and other quantities of access points and/or base stations may be used. Also, the types of the devices 12, 14, 16, 18, 20, 22 (e.g., an appliance, a smart phone, a tablet computer, a laptop computer, and a car) are examples and other types of devices may be used, whether currently existing or developed in the future. The term "base station" does not limit the base station 26 to any particular form, protocol, etc. For example, any of the base station 26 (and/or other base stations not shown) may be referred to as a base transceiver station (BTS), an access node (AN), a Node B, an evolved Node B (eNB), etc. Further, the device 22 is a car and while the primary function of a car is not as a communication device, the car will comprise a communication device as a part of the car, and for simplicity of the disclosure the car is considered as one type of communication device herein.

The system 10 comprises an Internet of Things (IoT) network in this example, with the devices 12, 14, 16, 18, 20, 22 configured to communicate with each other, particularly through one or more short-range wireless communication techniques. The system 10 being an IoT network is, however, an example and not required. Examples of short-range wireless communication techniques include BLUETOOTH communications, BLUETOOTH Low-Energy communications, and Wi-Fi communications. The devices 12, 14, 16, 18, 20, 22 may broadcast information, and/or may relay information from one of the devices 12, 14, 16, 18, 20, 22 to another or to another device such as the access point 24 and/or the base station 26. One or more of the devices 12, 14, 16, 18, 20, 22 may include multiple types of radios, e.g., a BLUETOOTH radio, a Wi-Fi radio, a cellular radio (e.g., LTE, CDMA, 3G, 4G, etc.), etc. such that information may be received using one radio and transmitted using a different radio. Further, one or more of the devices 12, 14, 16, 18, 20, 22 may be configured to determine range to another of the devices 12, 14, 16, 18, 20, 22 (e.g., using round-trip time (RTT), or observed time difference of arrival (OTDOA), or received signal strength indications (RSSI), or one or more other techniques, or a combination of one or more of any of these techniques) and/or to determine angle of arrival (AOA) of a signal from another of the devices 12, 14, 16, 18, 20, 22 and/or from one or more other devices such as the access point 24 and/or the base station 26.

Figure 2:
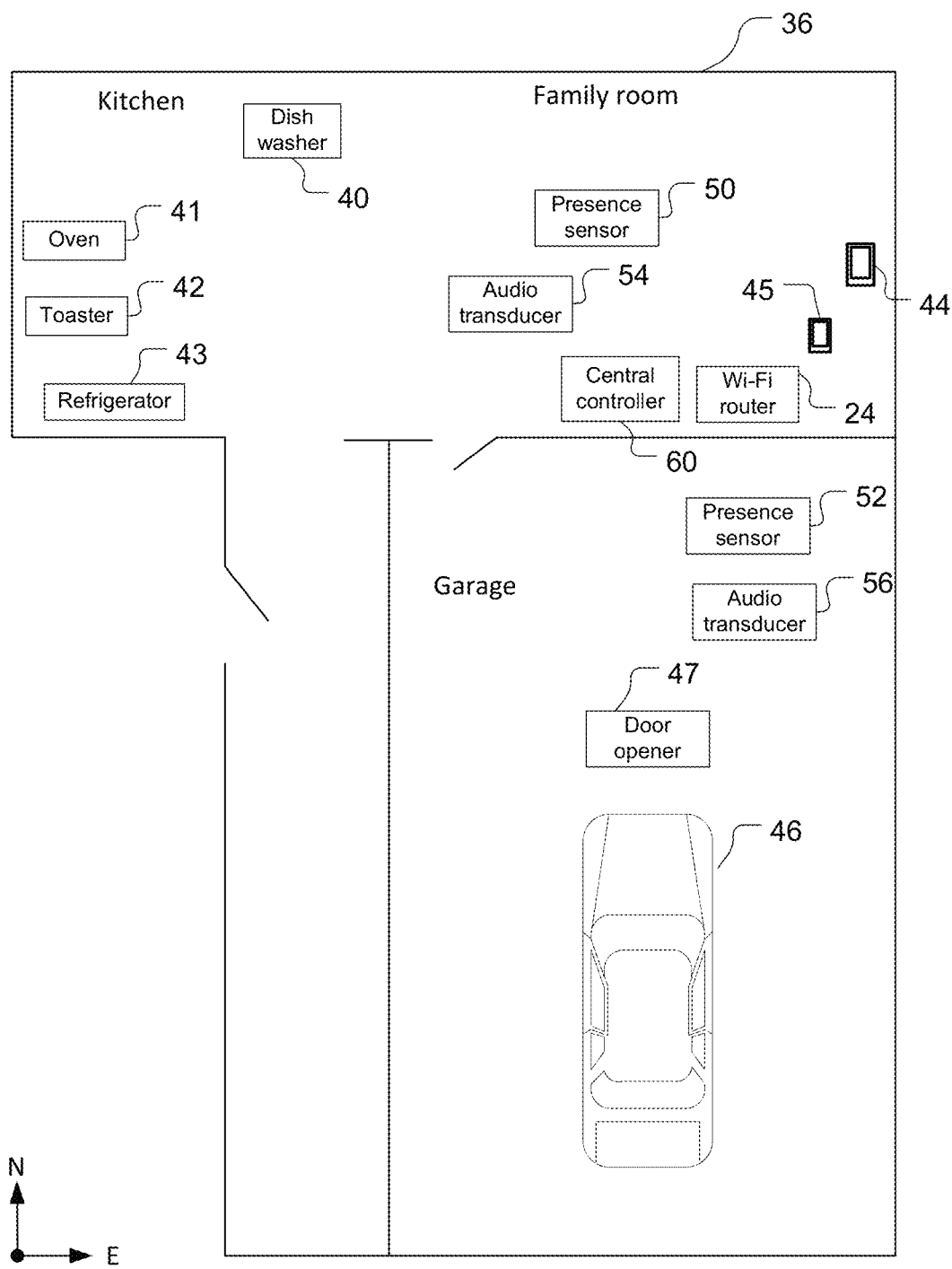
FIG. 2 is a simplified top view of an indoor portion of an example communication system.

Referring to FIG. 2, and indoor portion of the system 10 inside of the structure 36 includes wireless communication appliances/devices 40, 41, 42, 43, 44, 45, 47, presence sensors 50, 52, audio transducers 54, 56, a central controller 60, and the access point 24 (here a Wi-Fi router). In this example, the devices 40-47 include a dishwasher 40, an oven 41, a toaster 42, and a refrigerator 43 disposed in a kitchen, a tablet 44, a smartphone 45, and a car 46 and a garage door opener 47 disposed in a garage. These devices 40-47 are configured to communicate with each other if within communication range of each other, and to communicate with the presence sensors 50, 52 and the central controller 60. Using the communication capabilities between each other, information regarding the devices 40-47 may be sent to each other, relayed to other devices, or even relayed to the central controller 60. Further, communications from the central controller 60 may be received by, or forwarded by, the devices 40-47. Further still, the central controller 60 may be a standalone device as shown in FIG. 2 or may be incorporated into any of the devices 40-47. The system 10, in this example, provides an IoT network that can generate, send, receive, relay or forward, various information (e.g., attributes, attribute tables, information relating to attributes, signal measurements, location indications, acoustic information, etc.) to facilitate functionality described herein. The devices 40-47 are examples only, and other types of devices, as well as other quantities of devices, may be used.

The presence sensors 50, 52 facilitate detection of the presence of devices and/or users. The presence sensors 50, 52 may detect the presence of devices and/or persons in any of a variety of ways. For example, either or both of the presence sensors 50, 52 may comprise a movement sensor, e.g., that sends signals, measures their reflections, and compares present reflections with previous reflections. The signals may be visible or non-visible (e.g., infrared) light signals and audible or non-audible (e.g., ultrasound) sound signals. Either or both of the presence sensors 50, 52 may comprise a heat sensor, e.g., including an infrared sensor. Either or both of the presence sensors 50, 52 may be communicatively coupled (e.g., hard-wired or wirelessly in communication with) one or more of the devices 40-47 and/or the central controller 60. The presence sensors 50, 52 are configured to report the detection of presence (possibly only if new, or possibly new and ongoing) of a relevant object such as a person.

The audio transducers 54, 56 facilitate the reception and provision of commands from users to the central controller 60 or other appropriate device. The audio transducers are preferably communicatively coupled (e.g., hard-wired or in wireless communication with) the central controller 60 and are configured to receive verbal commands, convert these commands to electrical signals, and send the signals to the central controller 60 or other appropriate device. The audio transducers 54, 56 may send the signals to the central controller 60 or other appropriate device directly or indirectly (e.g., through one or more intermediate devices that relay the signals) such as one or more of the devices 40-47.

Figure 3:
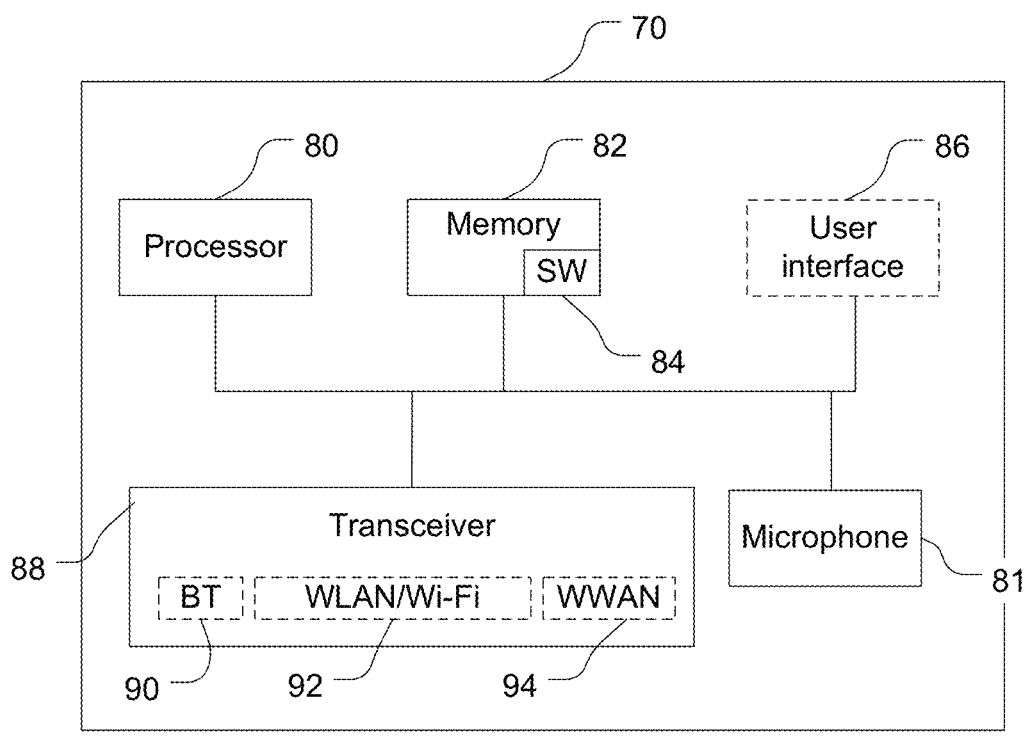
FIG. 3 is a block diagram of components of communication device shown in FIG. 2.

Referring to FIG. 3, with further reference to FIG. 1, an example device 70 comprises a computer system including a processor 80, a microphone 81, a memory 82 including software (SW) 84, an optional user interface 86, and a transceiver 88. In an embodiment, the device 70 may include a camera (not shown in FIG. 3). The processor 80 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 80 may comprise multiple separate physical entities that can be distributed in the device 70. The microphone 81 may include a transducer and other circuitry for providing acoustic information to the processor 80 in a digital or analog format. The microphone 81 may be a high sensitivity or high bandwidth microphone configured to detect acoustics that are not in the audible frequency range of human ears. The memory 82 may include random access memory (RAM) and/or read-only memory (ROM). The memory 82 is a non-transitory, processor-readable storage medium that stores the software 84 which is processor-readable, processor-executable software code containing instructions that are configured to, when performed, cause the processor 80 to perform various functions described herein. The description may refer only to the processor 80 or the device 70 performing the functions, but this includes other implementations such as where the processor 80 executes software and/or firmware. The software 84 may not be directly executable by the processor 80 and instead may be configured to, for example when compiled and executed, cause the processor 80 to perform the functions. Whether needing compiling or not, the software 84 contains the instructions to cause the processor 80 to perform the functions. The processor 80 is communicatively coupled to the memory 82. The processor 80 in combination with the memory 82, the user interface 86 (as appropriate), and/or the transceiver 88 provide means for performing functions as described herein, for example, means for receiving authentication information from a user, means for determining one or more companion devices, means for detecting the one or more companion devices, and means for validating the user based on the authentication information and a detection of the one or more companion devices. The device 70 may be an apparatus for authenticating a user. The software 84 can be loaded onto the memory 82 by being downloaded via a network connection, uploaded from a disk, etc. The device 70 may be any of the devices 40-47 shown in FIG. 2, or another device. The user interface 86 (e.g., a display and/or speaker) is optional, e.g., with the tablet 44 and the smartphone 45 including a display, a microphone 81, and a speaker while the garage door opener 47 does not (typically) include a display, a microphone 81, or a speaker, although the garage door opener 47 may include a user interface of some sort, e.g., switches operable by a user.

The transceiver 88 is configured to send communications wirelessly from the device 70 and to receive wireless communications into the device 70, e.g., from the devices 40-47, the access point 24, or the central controller 60. Thus, the transceiver 88 includes one or more wireless communication radios. In the example shown in FIG. 3, the transceiver 88 optionally includes a BLUETOOTH radio 90, a WLAN/Wi-Fi radio 92, and WWAN radio 94 (e.g., long-term evolution (LTE) radio). As shown, each of the radios 90, 92, 94 are optional, although the transceiver 88 will include at least one wireless communication radio. Further, one or more other types of radios may be included in the device 70 in addition to, or instead of, the radio(s) 90, 92, 94. If the transceiver 88 includes more than one wireless communication radio, then the transceiver 88 may receive a wireless communication using one of the wireless communication radios, and transmit (e.g., relay or forward), the communication (or a portion thereof) using a different wireless communication radio. The communication may be transmitted to another of the devices 40-47 or to another device such as the access point 24. Thus, for example, the device 70 may receive a wireless communication using the BLUETOOTH radio 90, and forward the communication using the WLAN/Wi-Fi radio 92 to another device that does not include a BLUETOOTH radio.

The processor 80 is configured to relay communications between devices, for example, from the central controller 60 the devices 40-47 or from the devices 40-47 to the central controller. For example, the processor 80 may receive, via the transceiver 88, the request from the central controller 60 (directly or indirectly, e.g., from another of the devices 40-47) for the location of one of the devices 40-47. The processor 80 may relay the request to one or more of the devices 40-47 within communication range of the device 70. The processor 80 is further configured to relay a reply from any of the devices 40-47 to the central controller 60, or to another device for further relay until the reply reaches the central controller 60. The reply, for example, may be a location of a target device, and the location may be a distance relative to another device, for example from the device from which the reply is received. In an example, the device 70 may also include a satellite navigation receiver module configured to receive navigation signals. For example, a Global Positioning System (GPS) module (not shown in FIG. 3) may include appropriate equipment for monitoring GPS signals from satellites and determining position of the device 70. For example, the GPS module may include one or more GPS antennas, and can either communicate with the processor 80 to determine location information or can use its own processor for processing the received GPS signals to determine the location of the device 70. Further, the GPS module can communicate with other entities such as a position determination entity or central server in order to send and/or receive assistance information for use in determining the location of the device 70.

Figure 4:
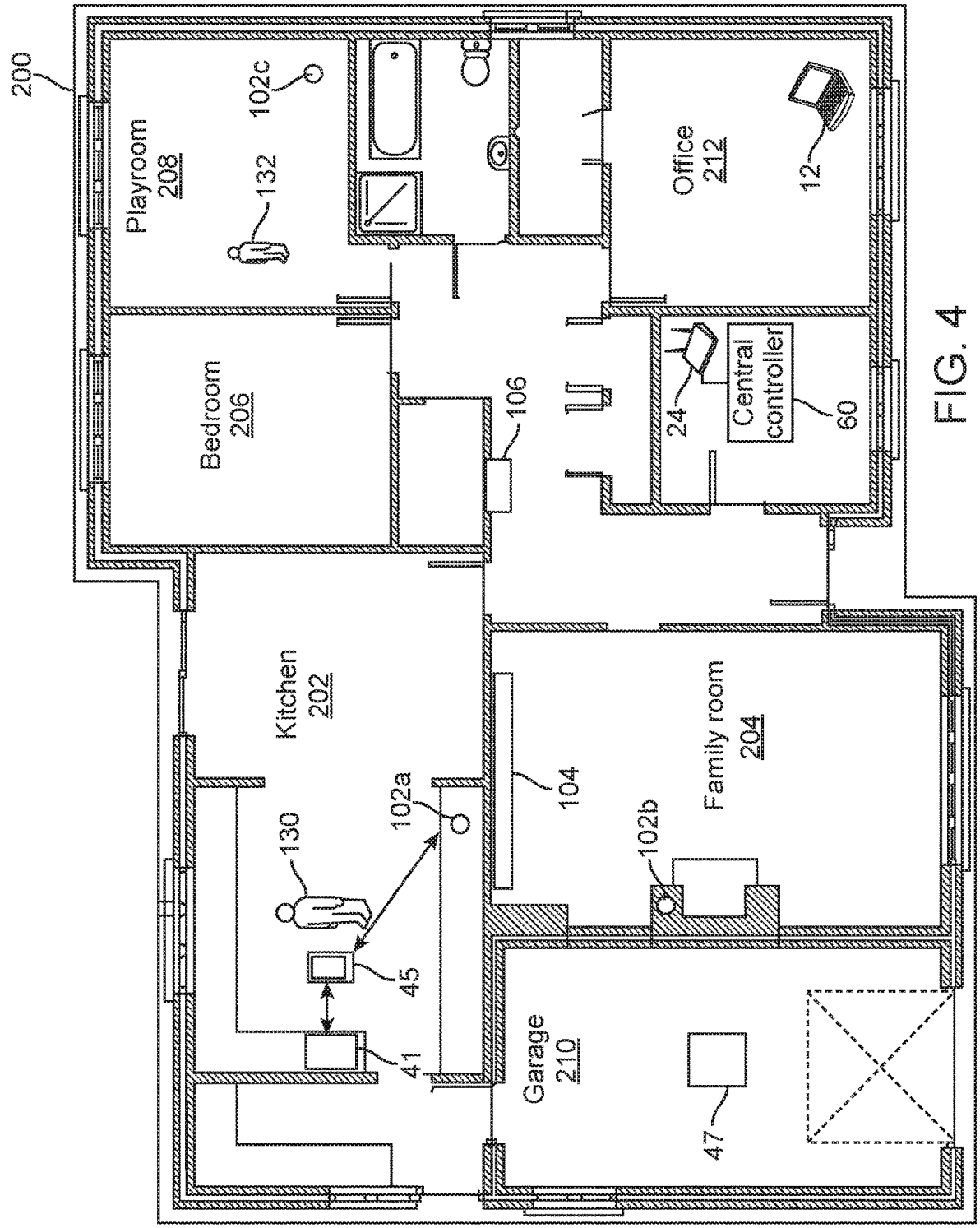
FIG. 4 is an example use case of peer assisted enhanced authentication in home network.

Referring to FIG. 4, with further reference to FIGS. 1-3, an example use case of peer assisted enhanced authentication in a home network is shown. A household communication system is shown in the context of a home 200. The home 200 and the devices therein are an example of a communication system 10. The home 200 includes a kitchen 202, a family room 204, a bedroom 206, a playroom 208, a garage 210, and an office 212. The household communication system includes a home network with an access point 24 and a central controller 60 which may be the same device (e.g., the central controller 60 may include the access point 24). Example devices within the home 200 include a computer device 12 (e.g., a laptop), the oven 41, the door opener 47, a kitchen smart speaker 102a, a family room smart speaker 102b, a playroom smart speaker 102c, a television 104, and a doorbell 106. The home 200 includes a first user 130 and a second user 132. The first user 130 is using a smartphone 45. Each of the devices 12, 41, 45, 47, 102a-c, 104, 106 may include elements of the device 70 in FIG. 3 and are configured to communicate with the central controller 60 (e.g., via the access point 24) or with one another. For example, the devices may be configured with a proximal discovery protocol such as BLUETOOTH proximity beacons or LTE (e.g., LTE Direct discovery beacons or LTE proximity services).

The following operational use cases are provided as examples to facilitate the explanation of peer assisted enhanced authentication in an IoT environment. The devices 12, 41, 45, 47, 102a-c, 104, 106 may be configured to perform device-to-device proximal discovery, and may be in communication with the central controller 60 via the access point 24. The first user 130 initiates a log-in procedure on the smartphone 45 by entering a password and/or a biometric input (e.g., a finger print, facial recognition). The smartphone 45 may perform discovery scans to verify the presence of proximal devices (e.g., via the transceiver 88) such as the oven 41 and the kitchen smart speaker 102a. The discovery scans may be performed in the background and may proceed the user's access attempt. For example, the discovery scans may be performed when the smartphone 45 is moved (e.g., based on motion sensor input). The smartphone 45 is configured to validate the combination of the user input (e.g., password/biometric) and the presence of a companion device (e.g., the oven 41, the kitchen smart speaker 102a). Access to the smartphone 45, user accounts, or particular applications executing on the smartphone, may be granted when both conditions are satisfied. The user may manually configure settings to specify which companion devices are to be used for authentication. In an example, a default mandatory companion device may be defined for all devices in a network. A user may associate a companion device with the log on criteria. For example, a fingerprint detector on a smartphone may also require the presence of a companion device while a facial recognition result may not need to detect a companion device. The peer assisted authentication may be configured to provides a secondary authentication check to guard against a potentially malicious access through the use of a stolen password, spoofed biometric input, or both.

Figure 5:
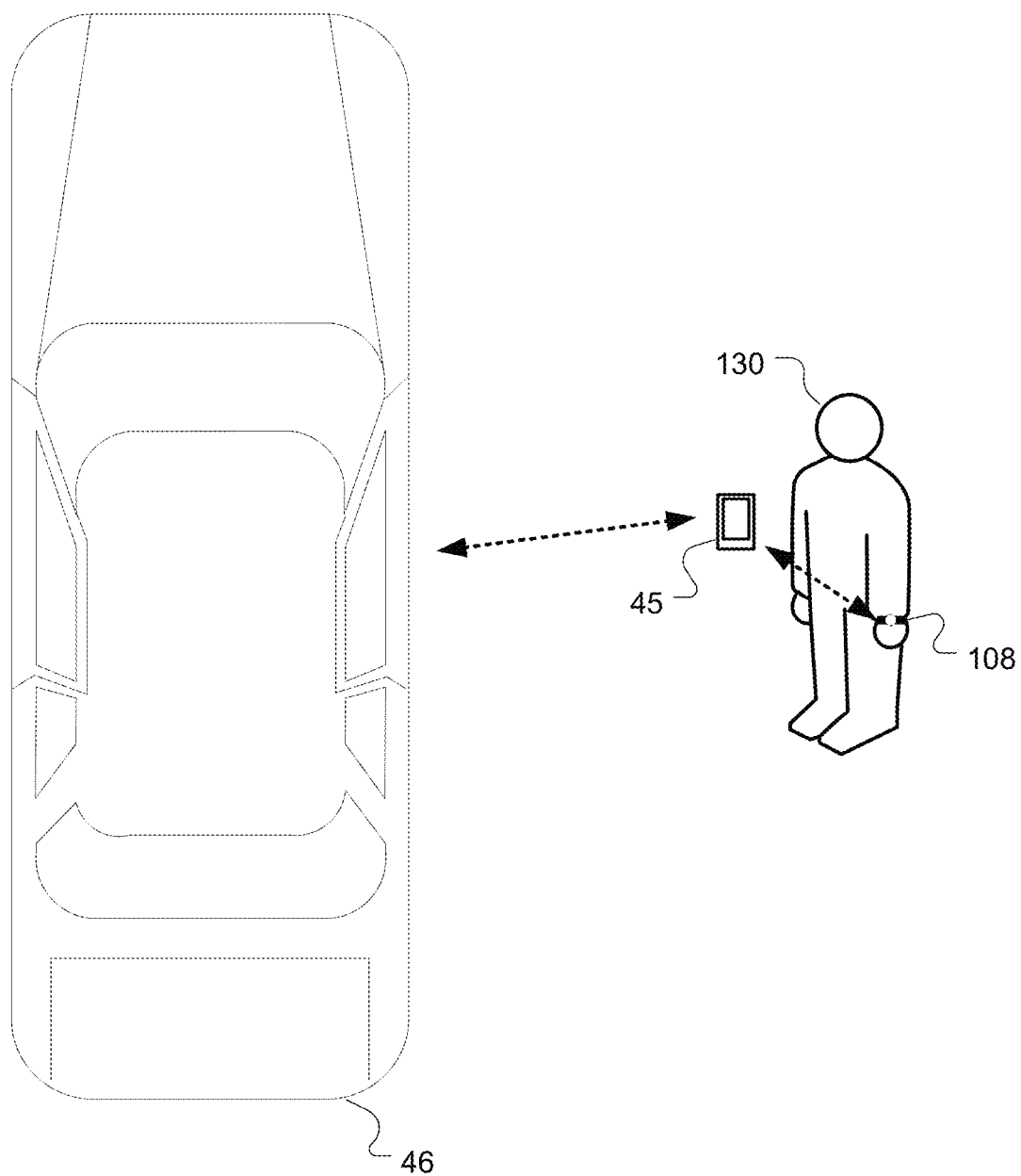
FIG. 5 is an example use case of peer assisted enhanced authentication in a mobile environment.

Referring to FIG. 5, with further reference to FIGS. 3 and 4, and example use case of a peer assisted enhanced authentication in a mobile environment is shown. The mobile environment includes the car 46, the smartphone 45 and the user 130. The user is wearing a sports band 108. The smartphone 45 is configured to validate (i.e., authenticate) a user based on one or more user inputs such as a password and/or biometric input and the presence of one or more companion devices. In this example, the first user 130 may manually program the smartphone 45 to detect the presence of the car 46 and/or the sports band 108. That is, to access user's smartphone 45, that sports band 108 may be used as one of the companion device when the user 130 is away from the home network. Thus, if the user 130 loses the smartphone 45, an attempt to unlock access/login to a certain account or application would be denied if the sports band 108 is not in the vicinity of the smartphone 45. In an example, the validation may depend on the presence of one or both of the car 46 and the sports band 108. The peer authentication may be used by other devices. For example, the car 46 may be configured to require a key and the presence of a companion device to start. The key may be a mechanical assembly or a wireless key system. The presence of the smartphone 45 (e.g., a companion device to the car 46) may be used as a secondary authentication check to guard against theft via a stolen/pirated key.

Figure 6A:
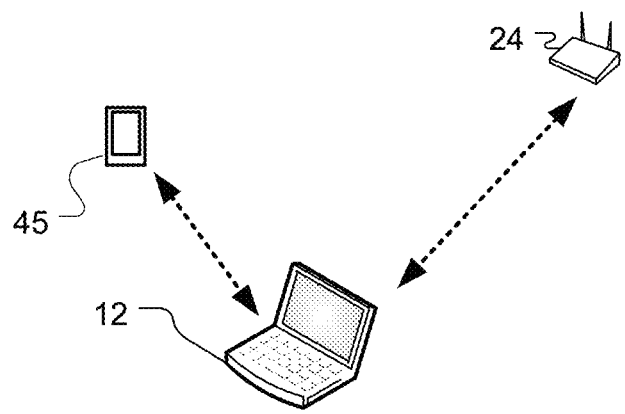
FIG. 6A is an example use case of mandatory peer assisted enhanced authentication in an office environment.

Referring to FIG. 6A, an example use case for mandatory peer assisted enhanced authentication in an office environment is shown. The office includes the laptop 12, the access point 24 and the smartphone 45. The laptop 12 is configured to receive user credentials such as a password/biometric input and confirm the presence of one or more companion devices. The presence detection may execute in the background prior to an attempted log on by the user. In one example, the laptop 12 runs discovery scans to identify known neighbors or peer devices. In an example, the laptop 12 may perform a location session to determine if the current location matches the locations of the peer devices. In this example, the authentication process requires the user credentials and the presence of both the smartphone 45 and the access point 24. The mandatory detection requirements may be used to increase the security in an office environment such that log-on credentials will not be validated unless the assigned user is present (e.g., the owner of the smartphone 45) and the access point 24 is detected. This increased security provides additional protection in the case of an unauthorized relocation of the laptop 12. In an example, the proximity validation may be based on a single companion device (e.g., the access point 24 or the smartphone 45). The laptop 12 may include a configuration application to enable a user, or network administrator, to establish the default required single or multiple proximate companion devices.

Figure 6B:
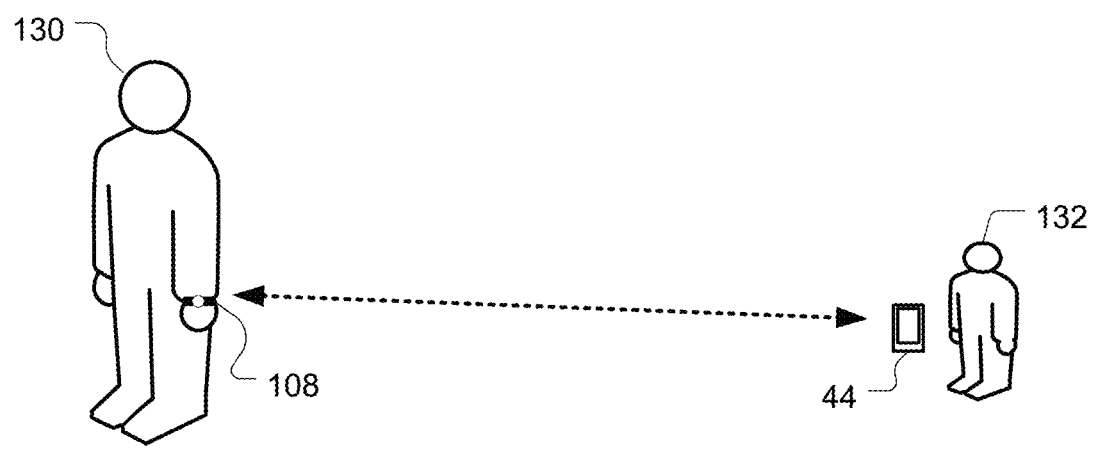
FIG. 6B is an example use case of peer assisted enhanced authentication and/or application authorization.

Referring to FIG. 6B, an example use case of peer assisted enhanced authentication and/or application authorization is shown. The use case includes the first user 130, the second user 132, the sports band 108, and the tablet 44. The second user 132 may be minor child and the first user 130 may desire to restrict access in whole or in part to the tablet 44. The tablet 44 may be configured with multiple mail and instant messaging accounts and access to the accounts may be based on a secondary validation using one or more proximity scans. For example, an instant messaging account associated with the first user 130 may only be accessed when the tablet 44 detects the sports band 108. Other applications on the tablet 44 may use the presence of a companion device to allow access. For example, streaming content may be restricted on the tablet 44 based on the detected companion devices. In this manner, a parent (e.g., the first user 130) may restricted their child (e.g., the second user 132) from utilizing the tablet 44 for viewing movies, browsing on the web, playing games, etc. . . . whenever the parent is not nearby (e.g., the sports band 108 is not detected). The proximity scans may be executed in the background periodically or based on other triggering events such as a detected movement, or when an application is initially executed and periodically thereafter. The tablet 44 may be configured to associate companion devices with different user log on credentials such that each user of a device may identify one or more companion devices. The applications on the tablet 44 may also be associated with a companion device such that each application and user combination may be associated with companion devices. The central controller 60 may be used as a centralized storage for the companion device information. In this way, the user/application/companion device combinations may be stored, modified and disseminated to other IoT devices in the home network.

Figure 7:
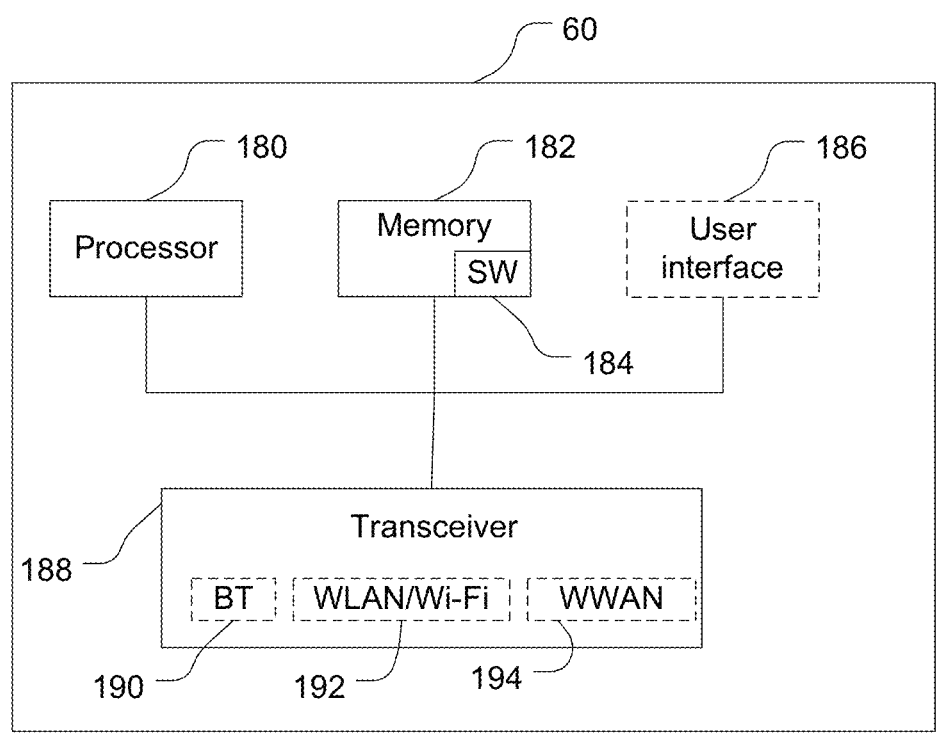
FIG. 7 is a block diagram of components of a central controller in a network.

Referring to FIG. 7, an example of the central controller 60 comprises a computer system including a processor 180, a memory 182 including software (SW) 184, an optional user interface 186, and a transceiver 188 optionally including a BLUETOOTH (BT) radio 190, a WLAN/Wi-Fi radio 192, and/or an WWAN radio 194. Other types of radios may also or alternatively be used, e.g., a BLUETOOTH-Low Energy (BT-LE) radio. The processor 180 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 180 may comprise multiple separate physical entities that can be distributed in the central controller 60. The memory 182 may include random access memory (RAM) and/or read-only memory (ROM). The memory 182 is a non-transitory, processor-readable storage medium that stores the software 184 which is processor-readable, processor-executable software code containing instructions that are configured to, when performed, cause the processor 180 to perform various functions described herein. The description may refer only to the processor 180 or the central controller 60 performing the functions, but this includes other implementations such as where the processor 180 executes software and/or firmware. The software 184 may not be directly executable by the processor 180 and instead may be configured to, for example when compiled and executed, cause the processor 180 to perform the functions. Whether needing compiling or not, the software 184 contains the instructions to cause the processor 180 to perform the functions. The processor 180 is communicatively coupled to the memory 182. The processor 180 in combination with the memory 182, the user interface 186 (as appropriate), and/or the transceiver 188 provide means for performing functions as described herein. The software 184 can be loaded onto the memory 182 by being downloaded via a network connection, uploaded from a disk, etc. The central controller 60 is shown in FIGS. 2 and 4 as a standalone device separate from the devices 12, 40-47, 102a-c, 104, and 106 but the central controller 60 could be implemented by one or more of the devices 12, 40-47, 102a-c, 104, and 106 and/or one or more other wireless communication devices such as the Wi-Fi router 24. The central controller 60 is preferably, though not necessarily, a (primarily) static device.

Figure 8:
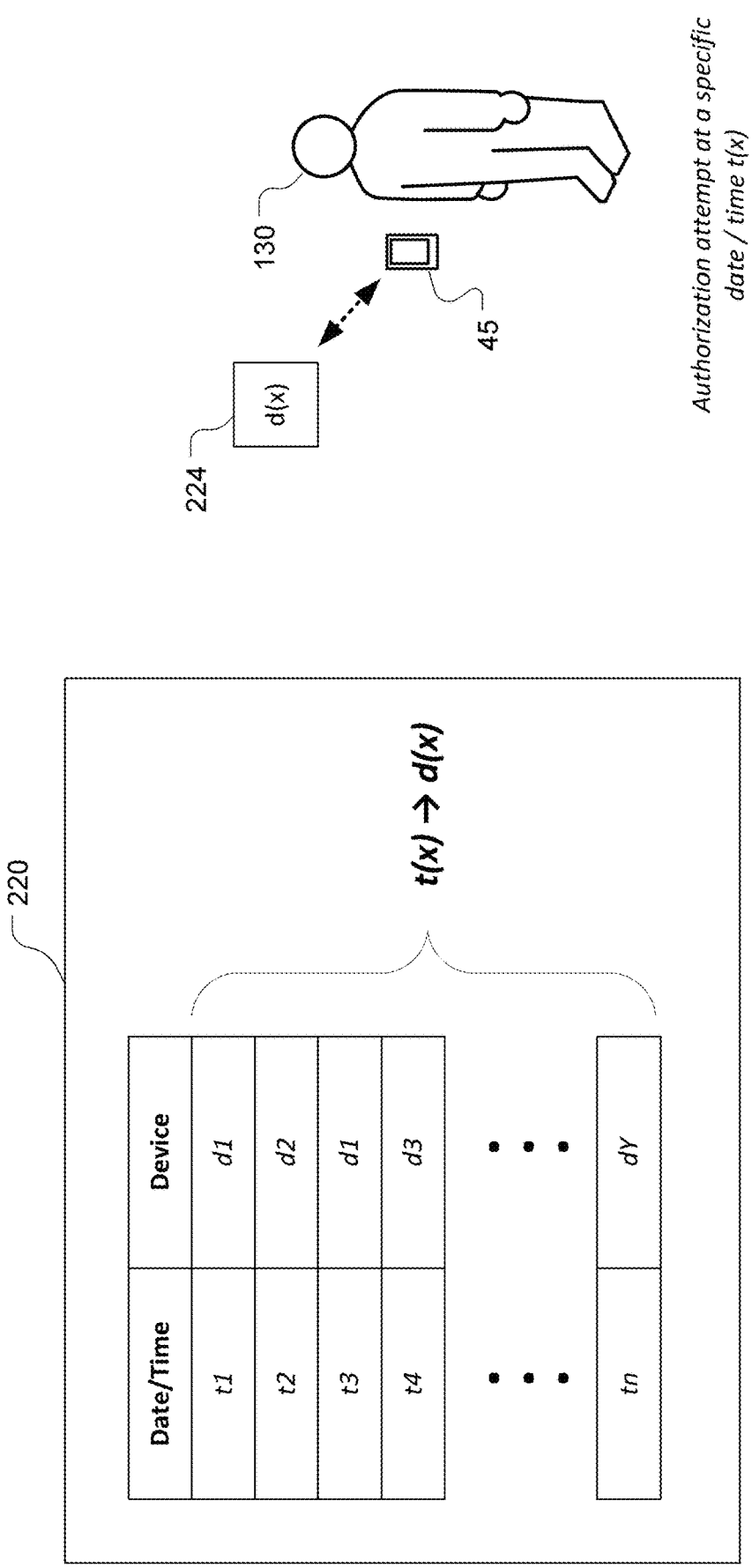
FIG. 8 is an example data structure for determining patterns of peer devices based on time.

Referring to FIG. 8, an example data structure 220 for determining patterns of peer devices based on time is shown. The data structure 220 may persist on the central controller 60 or on another device 70 (e.g., a smartphone 45, tablet 44, laptop 12, etc.). The data structure 220 may persist in a local memory on a device. The data structure 220 includes one or more tables, records, fields or other database objects associated with peer proximity results. For example, the data structure 220 may be a mobility profile including timestamp information (e.g., t1) based on the detection of a peer device (e.g., d1). The central controller 60 may function as a centralized location server. A mobility profile of each of the network devices may be determined over a period of time and updated to the central controller 60. Each of the devices may continuously update its companion devices to the central controller 60. Whenever the network devices sees/gets paired with a new companion device, the timestamp and device information may be updated to the central controller 60. Over time, the determination of expected companion devices may be based on self-learning from previous timestamp and device information. In general, the relationship may be determined such that t(x) leads to d(x), where t(x) is a specific time and date (e.g., the current time) and d(x) 224 is a list of one or more companion devices that are expected to be detected. For example, the data structure 220 may indicate that every weekday evening at 7 PM, the sports band 108 and the smartphone 45 are seen paired together for an hour. The data structure 220 may be extended to also include location information associated with the timestamp information (e.g., t1). In this example, both the timestamp information and the location information may be used to determine the list of companion devices based on the user's current location at the current time. The central controller 60, or a device 70, may over a period of time learn the behavior and mobility of the devices and may determine the companion devices for a particular device in view of a given day (weekday vs weekend), time of day etc. For stationary devices (e.g., a device with a location that may not change over a period of time), they may have certain other stationary devices in their companion list and few other mobile device depending on the time of the day. In an example, when an access attempt on a stationary device is made, a positioning session may be initiated in the background to confirm that the current location of the device is valid (e.g., the registered stationary location of the device). The stationary device may have other stationary companion devices as well as other mobile companion devices such as a smartphone, smartwatch, sports band, etc.

Figure 9A:
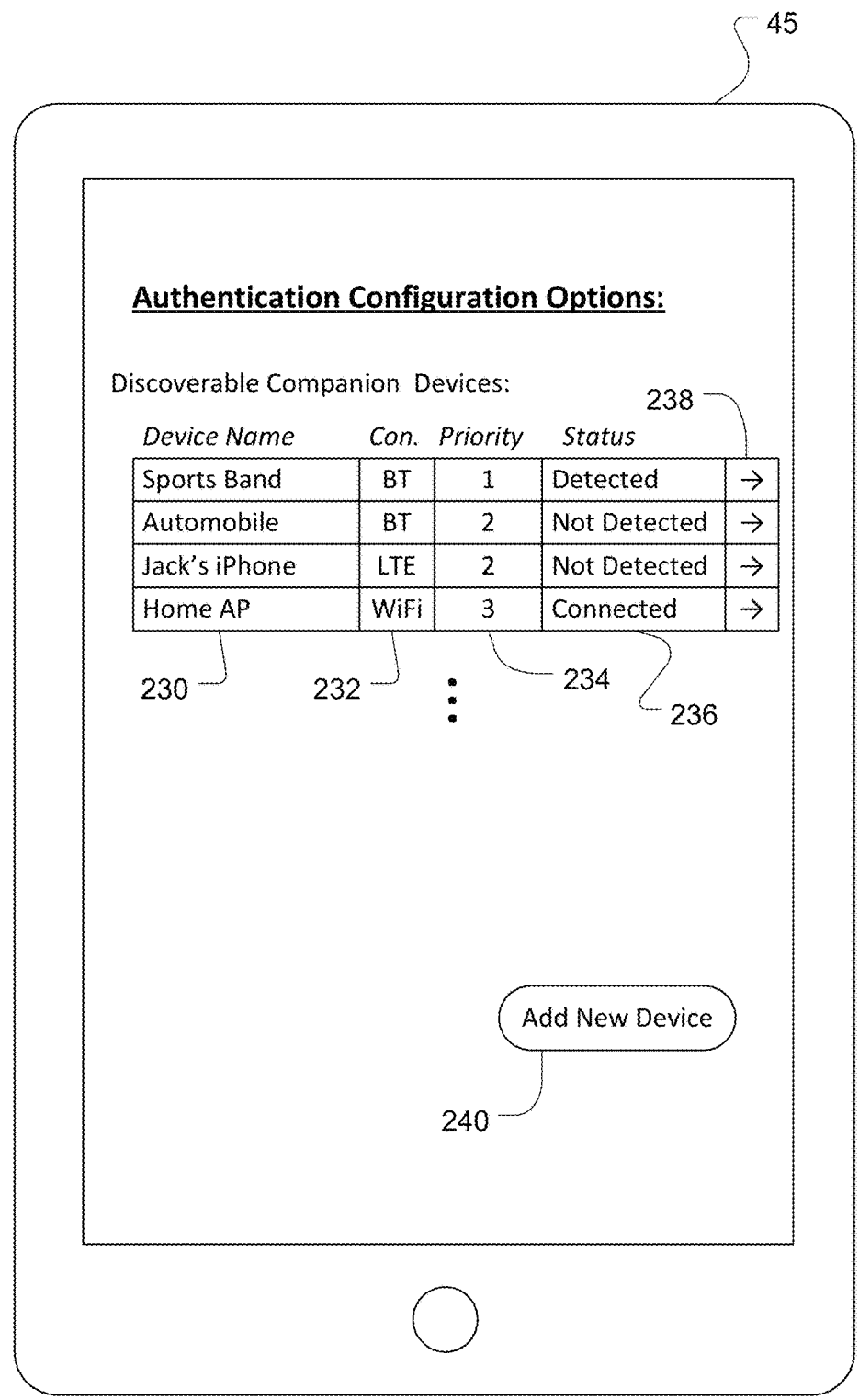
FIG. 9A is an example user interface for setting peer authentication configuration options.
Figure 9B:
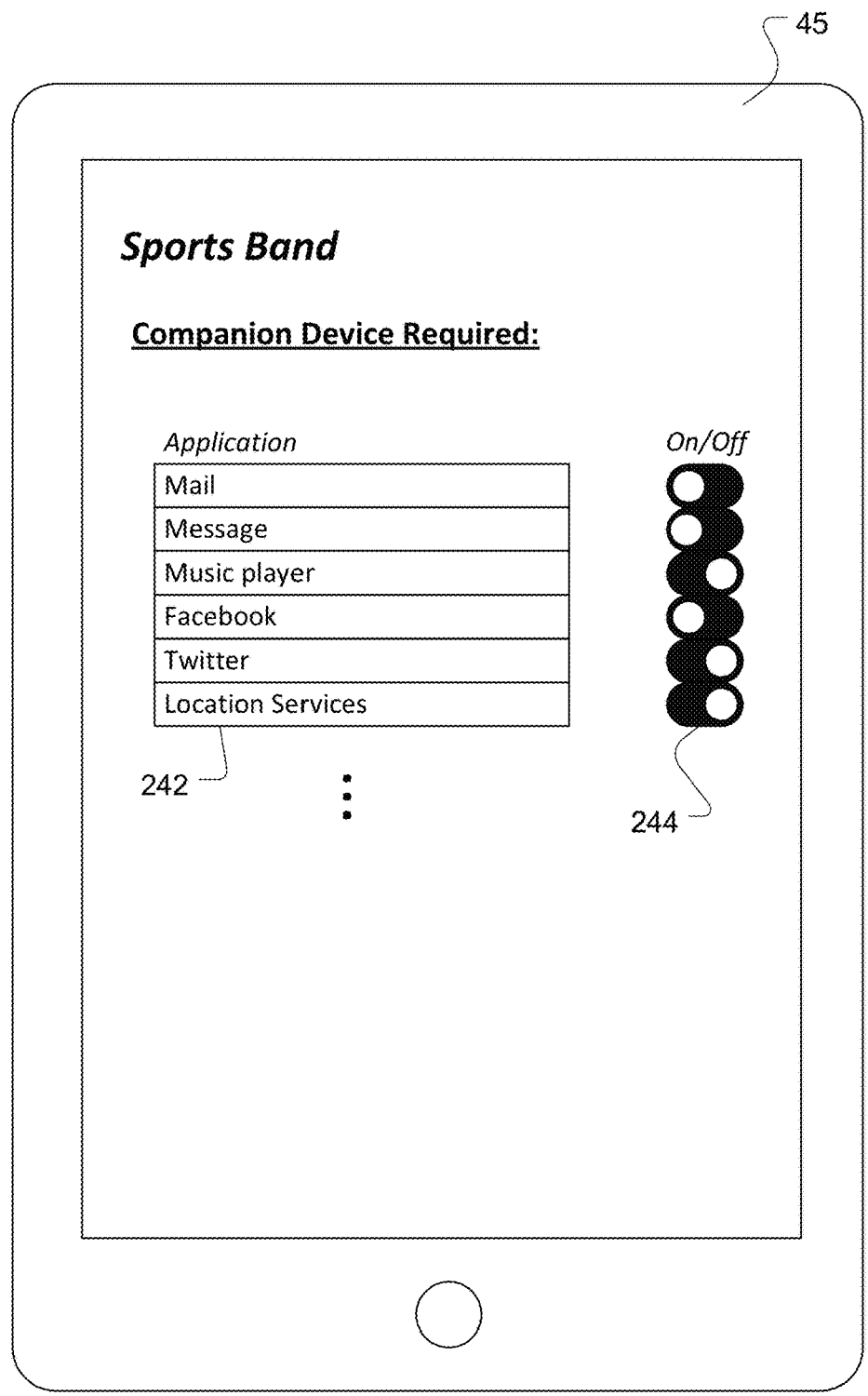
FIG. 9B is an example user interface for setting application and companion device options.

Referring to FIG. 9A, an example user interface for setting peer authentication configuration options is shown. The user interface may be an application running on the smartphone 45, or other device 70, such as the user interface 86 and may be used manually specify companion devices. As an example, and not a limitation, the configuration options may include a device name 230, a connection identifier 232, a priority value 234, a connection status 236, and an application configuration launch button 238. Other configuration options such as location, time/day, and user information may be entered into the smartphone 45. The device name 230 provides a text indication associated with a companion device. The device name 230 may be based on an identification assigned by a user (e.g., Jack's iPhone®), a machine assigned code (e.g., hexadecimal identifier), or other information to identify a device. The connection status 232 may be used to identify the protocol used to determine a proximal device. For example, BLUETOOTH (BT), BLUETOOTH Low Energy (BT-LE), Long-Term Evolution (LTE), and IEEE 802.11 standards (e.g., Wi-Fi). Other connection technologies may also be used. The priority value 234 may be used to indicate a level of access that the user will realize based on the companion device. For example, level 1 priority may allow full access to all applications on the smartphone. Level 2 priority may limit access to mail and messaging applications. Level 3 priority may limit a user's access to only low-level general applications (e.g., that do not disclose a user's personal information). Other priority/application combinations are possible. In an example, the application configuration launch button 238 may be used to open an application configuration user interface as depicted in FIG. 9B. for the respective companion device. Referring to FIG. 9B, an example user interface for setting application and companion device options is shown. The user interface may include a list of applications 242 and corresponding on/off slider button objects 244. The user interface objects are exemplary only and not limitations. The user interface allows a user to associate an application with a requirement that a companion device is detected. For example, as indicated in FIG. 9B, detection of the user's sports band is required before the Mail, Message, and Facebook® applications will execute. Other applications and companion devices may be similarly associated.

In an embodiment, the priority value 234 indicated in FIG. 9A may be used to indicate a search order in which the smartphone 45 will attempt to discover a device. The priority may also be used to indicate that the corresponding companion device is mandatory before a user is validated and/or any access is granted to the smartphone 45 (e.g., priority 'M').

The connection status 236 may be used to indicate that a connection is made between the indicated companion device and the smartphone 45. The term connection as used herein may include other proximal discovery approaches. For example, a companion device may be detected without creating a connection in a networking context. The device names 230 may be populated based on current and previous discovery processes. An Add New Device command button 240 may be used to manually add a device to the discoverable companion device list. The authentication configuration options may be associated at the device level (e.g., the smartphone 45), or with specific user accounts on the device (e.g., based on a user name field).

Figure 10:
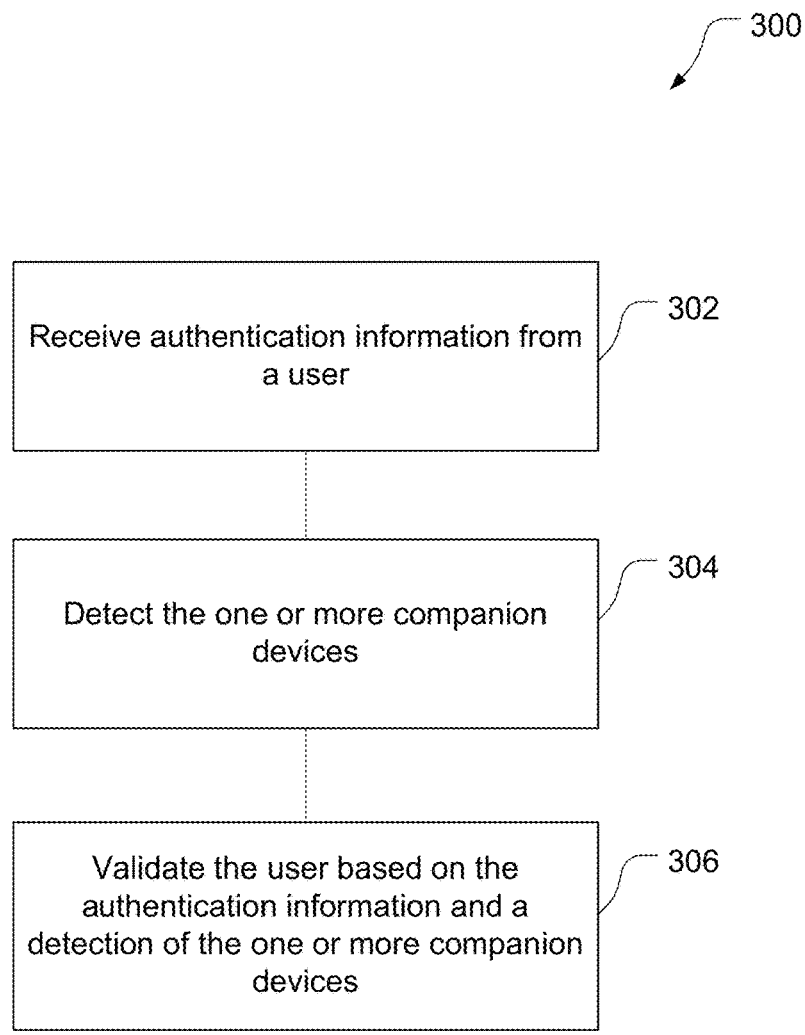
FIG. 10 is a block flow diagram of method of validating a user based on authentication information and a companion device.

Referring to FIG. 10, a method 300 of validating a user based on authentication information and a companion device includes the stages shown. The method 300 is, however, an example only and not limiting. The method 300 can be altered, e.g., by having stages added, removed, rearranged, combined, performed concurrently, and/or having single stages split into multiple stages. For example, receiving authentication information from a user at stage 302 and detecting the one or more companion devices at stage 304 may occur concurrently or sequentially in either order. A device 70 is a means for performing the elements of the method 300.

At stage 302, the method includes receiving authentication information from a user. A device 70 may be a means for receiving authentication information. For example, a smartphone 45 may include a user interface configured to receive a password or passcode from a user. A device 70 may also include a biometric sensor such as a camera (e.g., facial recognition, iris recognition) or a fingerprint scanner for use in an authentication process. The device 70 may receive the authentication information from such a biometric sensor. The authentication information may be requested and received from an application executing on the device 70. For example, the authentication information may be requested when trying to access the device generally (e.g., system start-up or wake-up), or the authentication information may be requested when a particular application is executed (e.g., mail, messenger applications, game center, etc.). The authentication information may be required when accessing a remote application such as secure website.

At stage 304, the method includes detecting the one or more companion devices. The device 70 is a means for detecting a companion device. The transceiver 88 in the device 70 may be utilized in a proximal discovery process. A companion device may be determined on a location-based approach wherein the locations of devices on a network are continuously tracked by a centralized server (e.g., the central controller 60) and proximity may be determined based on the relative distance between devices. Other device-to-device discovery techniques may also be used. For example, the transceiver 88 may be configured to utilize one or more BLUETOOTH signals such as generated by BLUETOOTH Low Energy proximity beacons or signals in the LTE spectrum such as generated by LTE Direct discovery technology. Combinations of location-based and device-to-device approaches may also be used. Active scanning for proximate devices may occur concurrently with, prior to, receiving authentication information from the user at stage 304. An active narrow scan for the one or more companion devices may also occur subsequent to stage 302.

At stage 306, the method includes validating the user based on the authentication information and a detection of the one or more companion devices. The device 70 may be a means for validating the user. The device 70 is configured to verify that the authentication information received from the user is the correct password and/or biometric information and then determine that at least one correct companion devices is detected. If both conditions are satisfied, the user is validated and may access the device 70, and/or the appropriate applications based on the authentication configuration options. For example, the correct combination of a password and the detection of a companion device will allow a user to access the device 70. One or more companion devices may be associated with different types of authentication information. A fingerprint scanner on a mobile device may be susceptible to spoofing and considered to be less secure than entering a password. In this example, if the authentication information is a fingerprint, then a user specific electronic device (e.g., sports band worn by the user, a media player carried by the user) may be required for validation. The same mobile device, however, may also validate the user based on a password input and an infrastructure specific device such as a large appliance or an access point (e.g., an infrastructure device is not generally associated with a specific user).

In an embodiment, the method includes determining one or more companion devices based on one or more context conditions. The device 70 may be a means for determining the companion devices. A companion device may be assigned by a user via an application executing on the device 70. For example, referring to FIG. 9A, the user may provide authentication configuration options via a user interface. The device 70 may also be configured to determine a companion device based on previous patterns of proximal peer devices. For example, referring to FIG. 8, the device 70 may include a data structure 220 and logic instructions configured to determine one or more companion devices based on the current time and/or current location of the user. The data structure 220 may exist on a remote storage device such as the central controller 60 and the device 70 may be configured to receive the one or more companion devices from the central controller 60. In an example, a list of companion devices may persist in a local memory on the device (e.g., the memory 82). A list of companion devices may be provided by the central controller 60 periodically (e.g., hourly, daily, weekly, etc.) or based on a triggering event on the device 70 such as a log-on attempt, change in location, or a detection of a new peer device, for example. The device 70 may determine the one or more companion devices as the most recent proximal peer devices. The device 70 may be configured to detect a currently executing application, and/or a remote application such as a website, may include a list of companion devices that are associated with a user account. For example, a remote email server may require a user to enter a password and be proximate to a specific companion device to gain access to the email files. A user may select/modify the appropriate companion device in the remote email account configuration settings. The identity of the required companion device may remain on the remote server to be provided to the device 70 when the user attempts to access their remote email account.

Figures 11A, 11B:
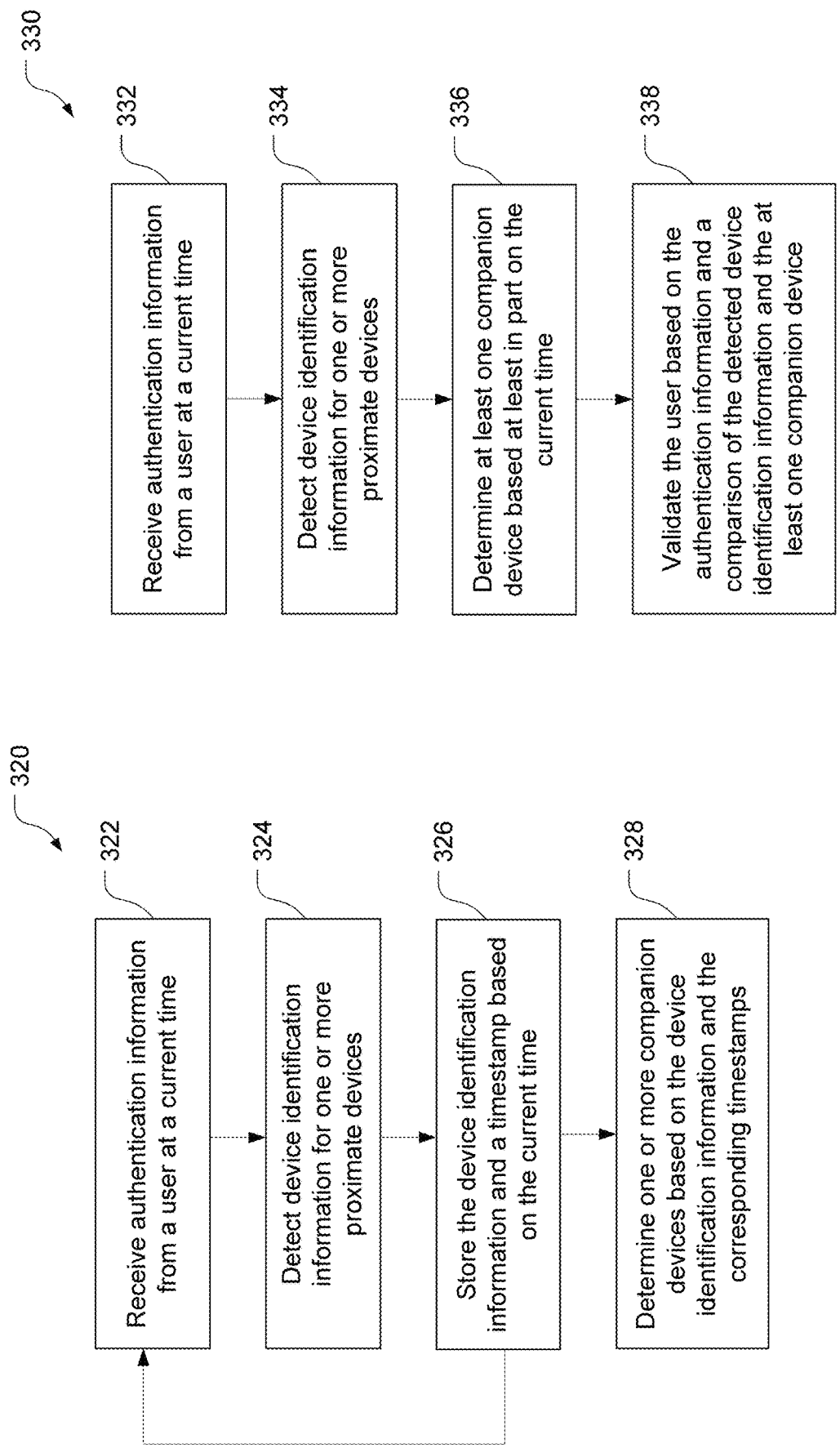
FIG. 11A is a block flow diagram of a method determining companion devices based on historical usage.
FIG. 11B is a block flow diagram of a method of validating a user based at least in part on a current time.

Referring to FIG. 11A, a method 320 for determining companion devices based on historical usage includes the stages shown. The method 320 is, however, an example only and not limiting. The method 320 can be altered, e.g., by having stages added, removed, rearranged, combined, performed concurrently, and/or having single stages split into multiple stages. A device 70 is a means for performing the elements of the method 320.

At stage 322, the method includes receiving authentication from a user at a current time. A device 70 may be a means for receiving authentication information. A device 70 may include a user interface configured to receive a password or passcode or biometric information from a user (e.g., finger print, facial recognition). The processor 80 may be a means for determining the current time. In a networked environment, the device 70 may receive the current time from a network resource. Optionally, the device 70 may also determine a current location at the current time. In an example, the central controller 60 may be configured to receive the authentication information from the user and determine a current time and a current location for the user.

At stage 324, the method includes detecting device information for one or more proximate devices. The device 70 is a means for detecting device information for proximate devices. The transceiver 88 in the device 70 may be utilized in a proximal discovery process. The identification information for the one or more proximal devices may be determined on a location-based approach wherein the locations of devices on a network are continuously tracked by a centralized server (e.g., the central controller 60) and proximity may be determined based on the relative distance between devices. A central server (e.g., the central controller 60) may be configured to provide the identification information for the proximate devices. Other device-to-device discovery techniques may also be used to detect the device information. The transceiver 88 may be configured to receive proximal device information via BT-LE proximity beacons or LTE Direct discovery technology. Combinations of central server based and device-to-device approaches may also be used.

At stage 326, the method includes storing the device identification information and a timestamp based on the current time. The device 70 may be a means for storing the identification information. The memory 82 in the device 70 may be configured to include one or more data structures 220 including fields for a timestamp (e.g., t1) and device identification information (e.g., d1). The timestamp may include time-of-day and date components to uniquely identify the current time. The data structure 220 may optionally store the current location (e.g., lat/long, ENU grid, etc.) of the device at the current time. In an example, the device 70 may be configured to provide the device identification information and the timestamp to a central server (e.g., central controller 60), and the central server may be configured to store the device information and the timestamp. The current location of the device 70 may also be stored on the central server.

At stage 328, the method includes determining one or more companion devices based on the device identification information and the corresponding timestamps. The device 70 may be a means for determining a companion device. The processor 80 may be configured to determine a mobility profile based on the stored identification information and timestamps. Referring to FIG. 8, a mobility profile may be determined such that t(x) leads to d(x), where t(x) is a specific time and date (e.g., the current time) and d(x) is a list of one or more companion devices that are expected to be detected. For example, the data structure 220 may indicate that on a majority of Saturday mornings at 9 AM, the kitchen smart speaker 102*a* and the smartphone 45 are seen paired together. In this example, the kitchen smart speaker 102*a* will be the determined companion device. The optional location information in the data structure 220 may also be used for determine the companion device. Continuing the example above, the data structure 220 may also indicate that on some Saturday mornings at 9 AM, the car 46 and the smartphone 45 are seen paired together when the user is not located in the kitchen. Thus, the location information may be used to restrict the list of possible companion devices. In an embodiment, a central server (e.g., the central controller 60) may be a means for determining a companion device. When a user attempts to access a device or application, the device may request a list of companion devices from the central server. The central server may be configured to provide a list of companion devices and the corresponding time and/or location criteria to a mobile device on periodic basis.

Referring to FIG. 11B, a method 330 for validating a user based at least in part on a current time includes the stages shown. The method 330 is, however, an example only and not limiting. The method 330 can be altered, e.g., by having stages added, removed, rearranged, combined, performed concurrently, and/or having single stages split into multiple stages. A device 70 is a means for performing the elements of the method 330.

At stage 332, the method includes receiving authentication from a user at a current time. A device 70 may be a means for receiving authentication information. A device 70 may include a user interface configured to receive a password or passcode or biometric information from a user (e.g., finger print, facial recognition). The processor 80 may be a means for determining the current time. In a networked environment, the device 70 may receive the current time from a network resource. Optionally, the device 70 may also determine a current location at the current time. In an example, the central controller 60 may be configured to receive the authentication information from the user and determine a current time and a current location for the user.

At stage 334, the method includes detecting device information for one or more proximate devices. The device 70 is a means for detecting device information for proximate devices. The transceiver 88 in the device 70 may be utilized in a proximal discovery process. The identification information for the one or more proximal devices may be determined on a location-based approach wherein the locations of devices on a network are continuously tracked by a centralized server (e.g., the central controller 60) and proximity may be determined based on the relative distance between devices. A central server (e.g., the central controller 60) may be configured to provide the identification information for the proximate devices. Other device-to-device discovery techniques may also be used to detect the device information. The transceiver 88 may be configured to receive proximal device information via BT-LE proximity beacons or LTE Direct discovery technology. Combinations of central server based and device-to-device approaches may also be used.

At stage 336, the method includes determining one or more companion devices based at least in part on the current time. The device 70 may be a means for determining a companion device. The processor 80 may be configured to retrieve a mobility profile from the memory 82 or the central controller 60. The mobility profile may be a data structure indexed by time and date information. For example, a query of the mobility profile using the current time/date as an input t(x) may return a result with at least one companion device d(x). For example, the mobility profile may indicate that during weekday evenings at 10 PM, the television 104 and the tablet 44 are seen paired together. Thus, a query of the mobility profile for a user at 10 PM will return the television 104 as the at least one companion device for the tablet 44. The current location of the device 70 may also be used for determine the companion device.

At stage 338, the method includes validating the user based on the authentication information and a comparison of the detected device identification and the at least one companion device. The device 70 may be a means for validating the user. The device 70 is configured to verify that the authentication information received from the user is the correct password and/or biometric information and then determine that the detected identification information matches the at least one companion device determined at stage 336. If both conditions are satisfied, the user is validated (i.e., authenticated) and may access the device 70, and/or the appropriate applications based on the authentication configuration options.

Figure 12:
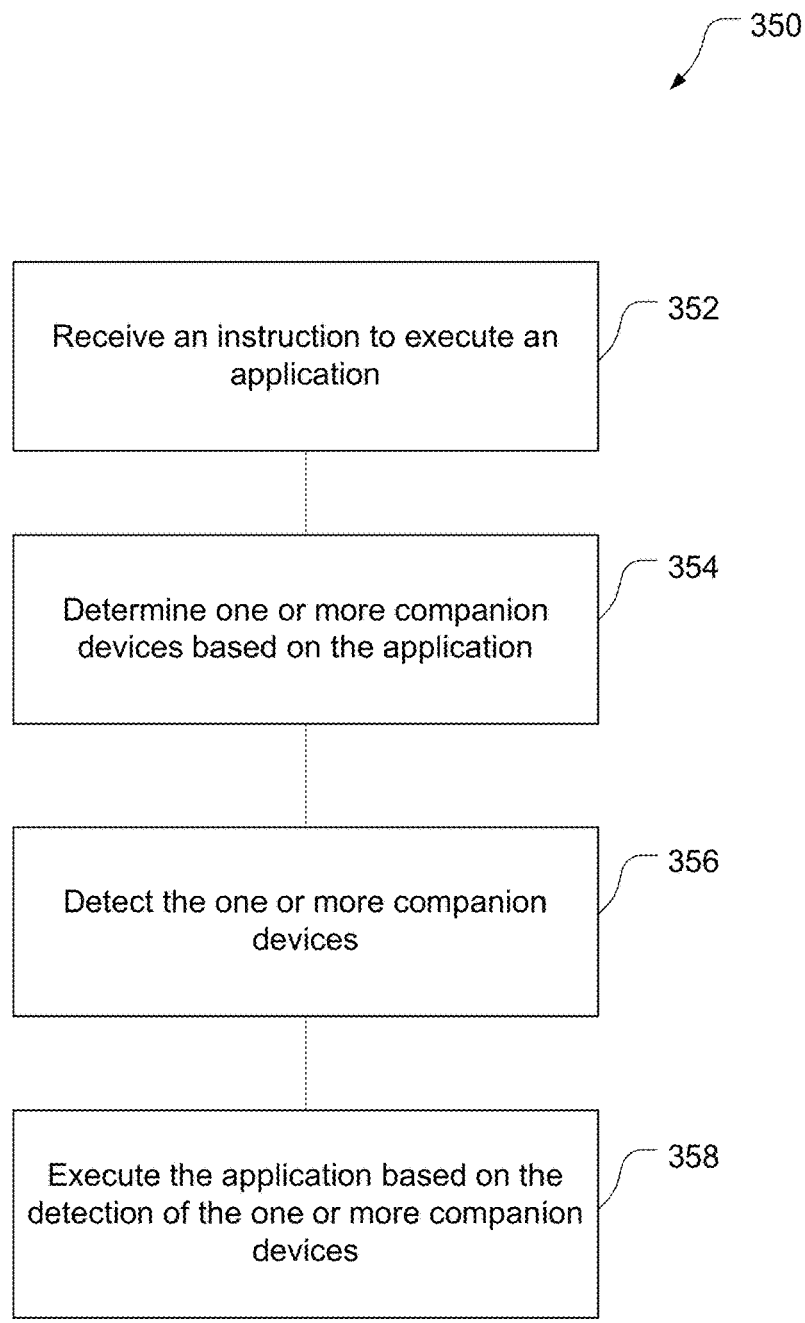
FIG. 12 is a block flow diagram of a method of executing an application based on a companion device.

Referring to FIG. 12, a method 350 of executing an application based on a companion device includes the stages shown. The method 350 is, however, an example only and not limiting. The method 350 can be altered, e.g., by having stages added, removed, rearranged, combined, performed concurrently, and/or having single stages split into multiple stages. The device 70 may be a means for performing the method 350.

At stage 352, the method includes receiving an instruction to execute an application. The user interface 86 may be a means for receiving an instruction to execute an application. In an example, the user of a device may tap an icon or enter a command prompt to execute an application. The instruction to execute an application may originate from another application and need not be dependent on a user input. For example, an email program may be configured to send an instruction to open a web browser to specific web address when an embedded web link is activated. The companion device verification described herein is not limited to applications and may be associated with other program objects and events such as an On Open, On Start, On Click, etc.

At stage 354, the method includes determining one or more companion devices based on the application. The device 70 may be a means for determining the companion devices. A companion device may be assigned by a user via an application executing on the device 70. For example, referring to FIGS. 9A and 9B, the user may provide authentication configuration options via a user interface. The user configuration options may include an indication that a companion device is required when an application 242 is executing. The association between a required companion device and an application is not limited to local applications on the device 70. Remote applications such as remote email servers, storage devices, websites, etc. may include a list of required companion devices that are associated with a user and/or user account. For example, a web merchant may require a user to enter a password and be proximate to a specific companion device to gain access to the complete orders. A user may select/modify the appropriate companion device in the remote account configuration settings. The identity of the required companion device may remain on the remote server to be provided to the device 70 when the user attempts to access their remote account.

At stage 356, the method includes detecting the one or more companion devices. The device 70 is a means for detecting a companion device. The transceiver 88 in the device 70 may be utilized in a proximal discovery process. A companion device may be determined on a location-based approach wherein the locations of devices on a network are continuously tracked by a centralized server (e.g., the central controller 60) and proximity may be determined based on the relative distance between devices. Other device-to-device discovery techniques may also be used. For example, the transceiver 88 may be configured to utilize BLUETOOTH Low Energy proximity beacons or LTE Direct discovery technology. Combinations of location-based and device-to-device approaches may also be used. Active scanning for proximate devices may occur concurrently with, or prior to, determining the one or more companion at stage 354.

At stage 358, the method includes executing the application based on the detection of the one or more companion devices. The device 70 may be a means for executing the application. The instruction received at stage 352 may be halted pending the detection of the one or more companion devices at stage 356. The execution of the application may continue when the companion device is detected. In an example, the device 70 may be configured to periodically verify the presence of the companion device during the execution of the application and halt the execution if they companion device is not detected.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, an indication that a device is configured to perform a stated function means that the device contains appropriate equipment (e.g., circuitry, mechanical device(s), hardware, software (e.g., processor-readable instructions), firmware, etc.) to perform the stated function. That is, the device contains equipment that is capable of performing the stated function, e.g., with the device itself having been designed and made to perform the function, or having been manufactured such that the device includes equipment that was designed and made to perform the function. An indication that processor-readable instructions are configured to cause a processor to perform functions means that the processor-readable instructions contain instructions that when executed by a processor (after compiling as appropriate) will result in the functions being performed.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, a wireless communication device may communicate through one or more wired connections as well as through one or more wireless connections.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium," "computer-readable medium," and "non-transitory processor-readable storage medium" as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Further, more than one invention may be disclosed.

The invention claimed is:

1. A method of validating a user on a communication device, comprising:
   receiving authentication information via a user interface;
   detecting one or more proximate devices at a current location of the communication device;
   determining presence of one or more companion devices from the detected one or more proximate devices based on a current time, the current location of the communication device, and a mobility profile that includes a historical listing of companion devices associated with the communication device; and
   validating the user based on the authentication information and the presence of the one or more companion devices.

2. The method of claim 1 wherein the one or more companion devices includes an infrastructure specific device.

3. The method of claim 1 wherein the one or more companion devices includes a user specific electronic device that is configured to be worn or carried by the user.

4. The method of claim 1 wherein determining the presence of the one or more companion devices includes receiving companion device information from a server.

5. The method of claim 1 wherein determining the presence of the one or more companion devices includes accessing companion device information from a memory in the communication device.

6. The method of claim 1 wherein the presence of the one or more companion devices is required for execution of one or more applications.

7. The method of claim 1 wherein determining the presence of the one or more companion devices includes determining a connection status between the one or more companion devices and the communication device.

8. The method of claim 1 further comprising:
   receiving, by the communication device, one or more priority values, wherein the one or more priority values indicate a level of access that the user will realize based on the detected one or more companion devices.

9. The method of claim 1 further comprising:
   receiving, by the communication device, an indication of a mandatory device, wherein the detection of the mandatory device is required for validating the user.

10. An apparatus for validating a user, comprising:
    a transceiver configured to detect one or more proximate devices at a current location of the apparatus; and
    at least one processor operably coupled to the transceiver and configured to:
       receive authentication information via a user interface;
       determine presence of at least companion device from the detected one or more proximate devices based on a current time, the current location of the apparatus, and a mobility profile that includes a historical listing of companion devices associated with the apparatus; and
       validate the user based on the authentication information and the presence of the at least one companion device.

11. The apparatus of claim 10 wherein the at least one companion device includes an infrastructure specific device.

12. The apparatus of claim 10 wherein the at least one companion device includes a user specific electronic device that is configured to be worn or carried by the user.

13. The apparatus of claim 10 wherein the at least one processor is configured to receive companion device information from a server to determine the presence of the at least one companion device from the one or more proximate devices.

14. The apparatus of claim 10 wherein the at least one processor is configured to access a local memory to obtain companion device information to determine the presence of the at least one companion device from the one or more proximate devices.

15. The apparatus of claim 10 wherein the presence of the at least one companion device is required for execution of one or more applications.

16. The apparatus of claim 10 wherein, to determine the presence of the at least one companion device, the at least one processor is further configured to determine a connection status between the at least one companion device and the apparatus.

17. The apparatus of claim 10 wherein the at least one processor is further configured to:
receive one or more priority values, wherein the one or more priority values indicate a level of access that the user will realize based on the detected at least one companion device.

18. The apparatus of claim 10 wherein the at least one processor is further configured to:
receive an indication of a mandatory device, wherein the detection of the mandatory device is required to validate the user.

19. An apparatus for validating a user on a communication device, comprising:
means for receiving authentication information via a user interface;
means for detecting one or more proximate devices at a current location of the communication device;
means for determining presence of one or more companion devices from the detected one or more proximate devices based on a current time, the current location of the communication device, and a mobility profile that includes historical listing of companion devices associated with the communication device; and
means for validating the user based on the authentication information and the presence of the one or more companion devices.

20. The apparatus of claim 19 further comprising means for receiving companion device information from a server.

21. The apparatus of claim 19 further comprising means for receiving companion device information from a local memory.

22. The apparatus of claim 19 wherein the presence of the one or more companion devices is required for execution of one or more applications.

23. The method of claim 6 wherein receiving, by the communication device, instructions to execute the one or more applications.

* * * * *